(12) United States Patent
Ohara et al.

(10) Patent No.: US 11,314,018 B2
(45) Date of Patent: Apr. 26, 2022

(54) POLYMER OPTICAL WAVEGUIDE AND COMPOSITE OPTICAL WAVEGUIDE

(71) Applicant: AGC Inc., Tokyo (JP)

(72) Inventors: Seiki Ohara, Tokyo (JP); Shotaro Takenobu, Tokyo (JP); Naoya Wada, Tokyo (JP)

(73) Assignee: AGC Inc., Tokyo (JP)

( * ) Notice: Subject to any disclaimer, the term of this patent is extended or adjusted under 35 U.S.C. 154(b) by 0 days.

(21) Appl. No.: 17/026,497

(22) Filed: Sep. 21, 2020

(65) Prior Publication Data

US 2021/0003780 A1 Jan. 7, 2021

Related U.S. Application Data

(63) Continuation of application No. PCT/JP2019/019005, filed on May 13, 2019.

(30) Foreign Application Priority Data

May 18, 2018 (JP) .............................. JP2018-096373

(51) Int. Cl.
*G02B 6/26* (2006.01)
*G02B 6/122* (2006.01)
*G02B 6/30* (2006.01)

(52) U.S. Cl.
CPC ............. *G02B 6/26* (2013.01); *G02B 6/1221* (2013.01); *G02B 6/30* (2013.01)

(58) Field of Classification Search
CPC ........... G02B 6/1221; G02B 6/26; G02B 6/30
USPC ...................................... 385/49–52, 129–132
See application file for complete search history.

(56) References Cited

U.S. PATENT DOCUMENTS

| 5,719,976 | A | * | 2/1998 | Henry ................ G02B 6/12004 |
| | | | | 385/28 |
| 9,696,498 | B2 | | 7/2017 | Jiang |
| 10,007,061 | B2 | | 6/2018 | Jiang |
| 10,222,554 | B2 | | 3/2019 | Ohara et al. |
| 2014/0112616 | A1 | | 4/2014 | Numata |
| 2016/0327749 | A1 | * | 11/2016 | Jiang ..................... C23C 14/542 |
| 2018/0156970 | A1 | * | 6/2018 | Ohara ....................... G02B 6/30 |

FOREIGN PATENT DOCUMENTS

| JP | 1-283507 A | 11/1989 |
| JP | 7-27942 A | 1/1995 |
| JP | 2014-81586 A | 5/2014 |
| WO | WO 2017/022719 A1 | 2/2017 |

OTHER PUBLICATIONS

International Search Report dated Jul. 2, 2019 in PCT/JP2019/019005 filed May 13, 2019, 2 pages.

* cited by examiner

*Primary Examiner* — Michael P Mooney
(74) *Attorney, Agent, or Firm* — Oblon, McClelland, Maier & Neustadt, L.L.P.

(57) ABSTRACT

The present invention relates to a polymer optical waveguide including: a core; an under-cladding; and an over-cladding, in which the polymer optical waveguide includes a coupling section and an optical waveguide section that are provided along a light propagation direction, the polymer optical waveguide includes portions having different core widths along the light propagation direction, and when a core width at a portion a having a narrowest core width is denoted Wa (μm) and a core height at the portion a is denoted Ha (μm), Ha is 1.3 μm or more and 4.5 μm or less, and Ha/Wa is 1.15 or less.

9 Claims, 7 Drawing Sheets

POLYMER OPTICAL WAVEGUIDE AND COMPOSITE OPTICAL WAVEGUIDE

TECHNICAL FIELD

The present invention relates to a polymer optical waveguide and a composite optical waveguide.

BACKGROUND ART

Silicon photonics, which is a technique of integrating silicon optical circuits on a silicon chip, has attracted attention. In silicon photonics, as a waveguide that transmits an optical signal between a silicon optical waveguide formed on optical integrated circuits and an optical fiber, a polymer optical waveguide using adiabatic coupling has been known (refer to, e.g., Patent Literature 1). When the polymer optical waveguide is used, a propagation loss between the silicon optical waveguide and the optical fiber can be reduced.

However, degree of reduction of the propagation loss between the silicon optical waveguide and the optical fiber in the case of using the polymer optical waveguide of Patent Literature 1 is not sufficient, and it is required to connect the silicon optical waveguide and the optical fiber with a lower loss.

Furthermore, it is also required to improve productivity and inspectability of the polymer optical waveguide.

CITATION LIST

Patent Literature

[Patent Literature 1] JP-A-2014-81586

SUMMARY OF INVENTION

Technical Problem

In order to solve the above-mentioned problem of the prior art, an object of the present invention is to provide a polymer optical waveguide that can achieve adiabatic coupling with a silicon optical waveguide and connection with an optical fiber with a low loss and has high productivity. Furthermore, another object of the present invention is to provide a polymer optical waveguide that can be easily inspected.

Solution to Problem

To achieve the above objects, there is provided a polymer optical waveguide including: a core; an under-cladding that has a refractive index lower than a refractive index of the core and is provided around the core; and an over-cladding that has a refractive index lower than the refractive index of the core and is provided around the core on a side opposite to the under-cladding, in which the polymer optical waveguide includes a coupling section and an optical waveguide section that are provided along a light propagation direction, the coupling section is a section in which the over-cladding is not provided and the core and the under-cladding around the core are exposed, and the optical waveguide section is a section in which the core is covered with the under-cladding and the over-cladding, in which the polymer optical waveguide includes portions having different core widths along the light propagation direction, and in which, when a core width at a portion a having a narrowest core width is denoted Wa (μm) and a core height at the portion a is denoted Ha (μm), Ha is 1.3 μm or more and 4.5 μm or less, and Ha/Wa is 1.15 or less.

In the polymer optical waveguide of the present invention, the portion a is preferably located in the optical waveguide section.

In the polymer optical waveguide of the present invention, Wa is preferably 1.3 μm or more and 4.5 μm or less.

It is preferable that the polymer optical waveguide of the present invention includes a plurality of the cores disposed along the light propagation direction, and has a pitch between the plurality of cores differing on one end side and the other end side of the polymer optical waveguide, in which the polymer optical waveguide includes a pitch changing region that changes the pitch between the plurality of cores, and, when the core width in the pitch changing region is denoted Wp (μm), Wp is 2.2 μm or more and 6 μm or less.

The polymer optical waveguide of the present invention preferably has an absolute value of a refractive index difference between the under-cladding and the over-cladding being 0.001 or less.

The polymer optical waveguide of the present invention preferably has a relative refractive index difference u between the core and the under-cladding being 0.006 to 0.017, and preferably has a relative refractive index difference o between the core and the over-cladding being 0.006 to 0.017.

In the polymer optical waveguide of the present invention, when the core width in the coupling section is denoted Ws (μm), Ws is preferably 3 μm or more and 8 μm or less.

The polymer optical waveguide of the present invention may include a plurality of the cores disposed along the light propagation direction, and at least one of the plurality of cores may not be included in the coupling section and may be included in only the optical waveguide section.

In the polymer optical waveguide of the present invention, the core is preferably made of a polymer containing fluorine.

The present invention also provides a composite optical waveguide including the polymer optical waveguide of the present invention and a connector that accommodates the optical waveguide section of the polymer optical waveguide.

Advantageous Effects of Invention

In the polymer optical waveguide of the present invention, peeling of a core film during manufacturing is prevented, and thus productivity is improved.

In the polymer optical waveguide of the present invention, adiabatic coupling with a silicon optical waveguide can be achieved with a low loss.

In the polymer optical waveguide of the present invention, a bending loss in the pitch changing region can be reduced.

In the polymer optical waveguide of the present invention, connection with a single-mode optical fiber can be achieved with a low loss.

In the polymer optical waveguide of the present invention including a core for optical measurement, included in only the optical waveguide section, inspection such as propagation loss measurement can be easily performed.

DESCRIPTION OF EMBODIMENTS

Hereinafter, the present invention will be described with reference to the drawings.

Figure 1:
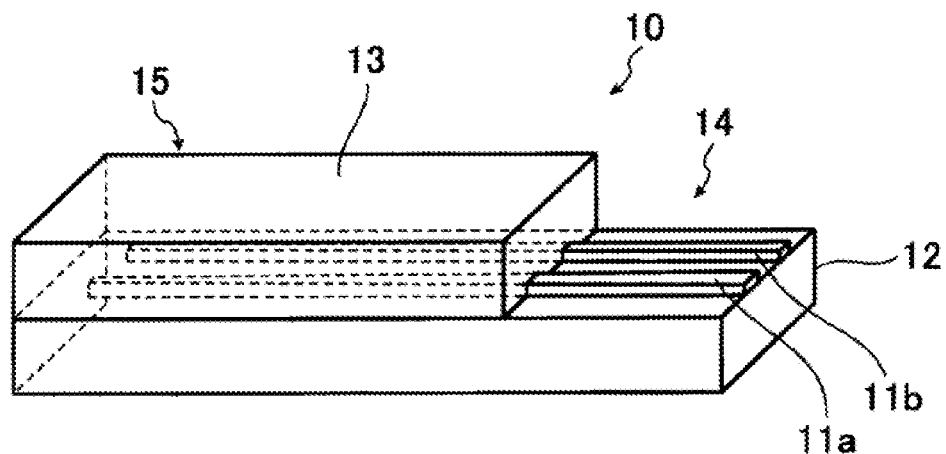
FIG. 1 is a perspective view illustrating a configuration example of a polymer optical waveguide of the present invention.

FIG. 1 is a perspective view illustrating a configuration example of a polymer optical waveguide of the present invention. The polymer optical waveguide 10 illustrated in FIG. 1 includes cores 11a and 11b, an under-cladding 12 that has a refractive index lower than a refractive index of the cores 11a and 11b and is provided around the cores 11a and 11b, and an over-cladding 13 that has a refractive index lower than the refractive index of the cores 11a and 11b and is provided around the cores 11a and 11b on a side opposite to the under-cladding 12. The polymer optical waveguide 10 includes a coupling section 14 and an optical waveguide section 15 that are provided along a light propagation direction, the coupling section 14 is a section in which the over-cladding 13 is not provided and the cores 11a and 11b and the under-cladding 12 around the cores 11a and 11b are exposed, and the optical waveguide section 15 is a section in which the cores 11a and 11b are covered with the under-cladding 12 and the over-cladding 13.

In the polymer optical waveguide 10 illustrated in FIG. 1, the two cores 11a and 11b are disposed along the light propagation direction of the core of the polymer optical waveguide 10 (hereinafter, referred to as "light propagation direction of the polymer optical waveguide" in this specification). Here, the number of the cores in the polymer optical waveguide of the present invention is not limited thereto, and the number of the cores may be one or may be three or more.

The polymer optical waveguide 10 illustrated in FIG. 1 includes portions having different core widths along the light propagation direction of the polymer optical waveguide. Specifically, on one end side and the other end side of the polymer optical waveguide 10 in the light propagation direction, a core width is different.

In this specification, the term "core width" refers to a width of the core in a direction perpendicular to a thickness direction of the polymer optical waveguide in a cross-section perpendicular to the light propagation direction of the polymer optical waveguide.

In this specification, the term "core height" refers to a height of the core in the thickness direction of the polymer optical waveguide in a cross-section perpendicular to the light propagation direction of the polymer optical waveguide.

Figure 2:
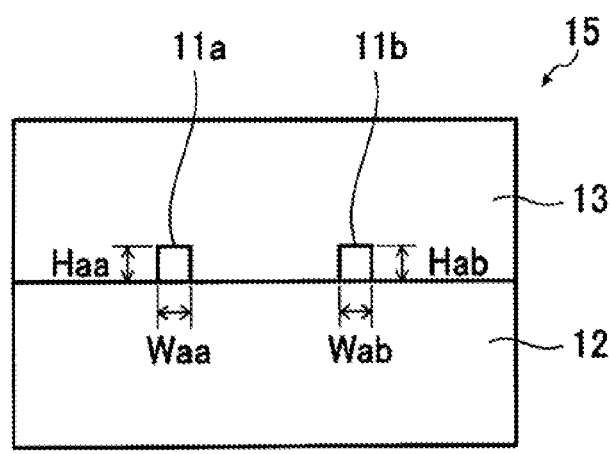
FIG. 2 is a view illustrating an end surface of the polymer optical waveguide 10 illustrated in FIG. 1 on an optical waveguide section 15 side.
Figure 3:
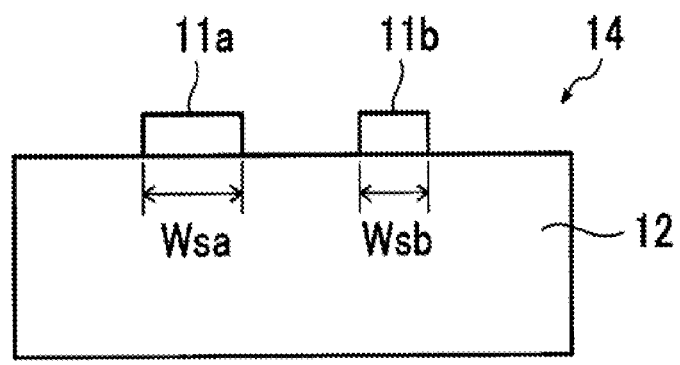
FIG. 3 is a view illustrating an end surface of the polymer optical waveguide 10 illustrated in FIG. 1 on a coupling section 14 side.

FIG. 2 is a view illustrating an end surface of the polymer optical waveguide 10 illustrated in FIG. 1 on the optical waveguide section 15 side, and FIG. 3 is a view illustrating the other end surface of the polymer optical waveguide 10 illustrated in FIG. 1 on the coupling section 14 side.

As illustrated in FIG. 2, in the optical waveguide section 15 side (one end side) of the polymer optical waveguide 10, the cores 11a and 11b have a quadrilateral shape in which the core heights are substantially the same as the core widths.

As illustrated in FIG. 3, in the coupling section 14 side (the other end side) of the polymer optical waveguide 10, the cores 11a and 11b have a quadrilateral shape in which the core widths are longer than the core heights.

In the illustrated polymer optical waveguide 10, the core widths of the cores 11a and 11b are wider on the coupling section 14 side (the other end side) than on the optical waveguide section 15 side (one end side).

In the illustrated polymer optical waveguide 10, an end surface on the optical waveguide section 15 side (one end side) is a portion a having the narrowest core width.

In the polymer optical waveguide 10, when the core width at the portion a is denoted Wa (μm) and the core height at the portion a is denoted Ha (μm), Ha is 1.3 μm or more and 4.5 μm or less, and Ha/Wa is 1.15 or less.

In the polymer optical waveguide 10 illustrated in FIG. 2, all of the core width Waa and the core height Haa of the core 11a and the core width Wab and the core height Hab of the core 11b satisfy the above-described condition.

The portion a, which is the end surface on the optical waveguide section 15 side, is used as a connection portion with a single-mode optical fiber. Since the core height Ha of the portion a is 1.3 μm or more, the portion a can be connected to a single-mode optical fiber with a low loss. The core height Ha of the portion a is preferably 1.4 μm or more, more preferably 1.5 μm or more, still more preferably 1.6 μm or more, and particularly preferably 1.8 μm or more.

Here, in the case where the core height Ha of the portion a becomes higher, a core film is likely to peel when manufacturing a polymer optical fiber in a procedure to be described later. The peeling of the core film causes a problem such as disconnection of the manufactured polymer optical waveguide. For this reason, the core height Ha of the portion a is set to 4.5 μm or less. The core height Ha of the portion a is preferably 2.2 μm or less, more preferably 2.1 μm or less, and still more preferably 2.0 μm or less.

In the polymer optical waveguide 10, the core heights of the cores 11a and 11b are basically constant along the light propagation direction. Thus, when the core height Ha (Haa, Hab) of the portion a is within the above-mentioned range, the core heights of other portions are also within the above-mentioned range. Therefore, the core height of the end surface on the coupling section 14 side is also within the above-mentioned range.

Furthermore, even in the case where the core height Ha of the portion a is 4.5 μm or less, in a case where the core of the portion a has a narrow core width Wa and a high core height Ha, the core film is likely to peel when manufacturing the polymer optical fiber in a procedure to be described later. For this reason, a ratio (Ha/Wa) between the core height Ha and the core width Wa of the portion a is 1.15 or less. Ha/Wa is preferably 1.1 or less, more preferably 1.0 or less, and still more preferably 0.9 or less.

As described above, in the polymer optical waveguide 10, the core height of the core 11 is constant along the light propagation direction. On the other hand, since the portion a is a portion having the narrowest core width of the core 11, the core width of the core 11 is Wa or more in portions other than the portion a. Therefore, in the case where Ha/Wa of the portion a is within the above-mentioned range, the ratio between the core height and the core width of the other portion is also within the above-mentioned range.

From the relationship of the core height Ha of the portion a and the ratio (Ha/Wa) between the core height Ha and the core width Wa, the core width Wa is preferably 1.3 μm or more, more preferably 1.5 μm or more, still more preferably 1.8 μm or more, and particularly preferably 2.0 μm or more.

Furthermore, the core width Wa is preferably 4.5 μm or less, more preferably 4.0 μm or less, still more preferably 3.5 μm or less, and particularly preferably 3.0 μm or less.

In the polymer optical waveguide of the present invention, the portion a having the narrowest core width may be present in portions other than the illustrated portion. However, the portion a having the narrowest core width is preferably present in the optical waveguide section used for connection with a single-mode optical fiber.

In the polymer optical waveguide 10 illustrated in FIG. 3, the coupling section 14, in which the over-cladding 13 is not provided and the cores 11a and 11b and the under-cladding 12 around the cores 11a and 11b are exposed, is used as an adiabatic coupling section with a silicon optical waveguide.

In the illustrated polymer optical waveguide 10, the core widths Ws (Wsa, Wsb) of the cores 11a and 11b of the coupling section 14 are preferably 3 μm or more for achieving connection with a silicon optical waveguide with a low loss. The core widths Ws (Wsa, Wsb) of the cores 11a and 11b of the coupling section 14 are more preferably 3.5 μm or more, and still more preferably 4 μm or more.

In the illustrated polymer optical waveguide 10, the core widths Ws (Wsa, Wsb) of the cores 11a and 11b of the coupling section 14 are preferably 8 μm or less for achieving connection with a silicon optical waveguide with a low loss. The core widths Ws (Wsa, Wsb) of the cores 11a and 11b of the coupling section 14 are more preferably 7 μm or less, and still more preferably 6 μm or less.

Figure 4:
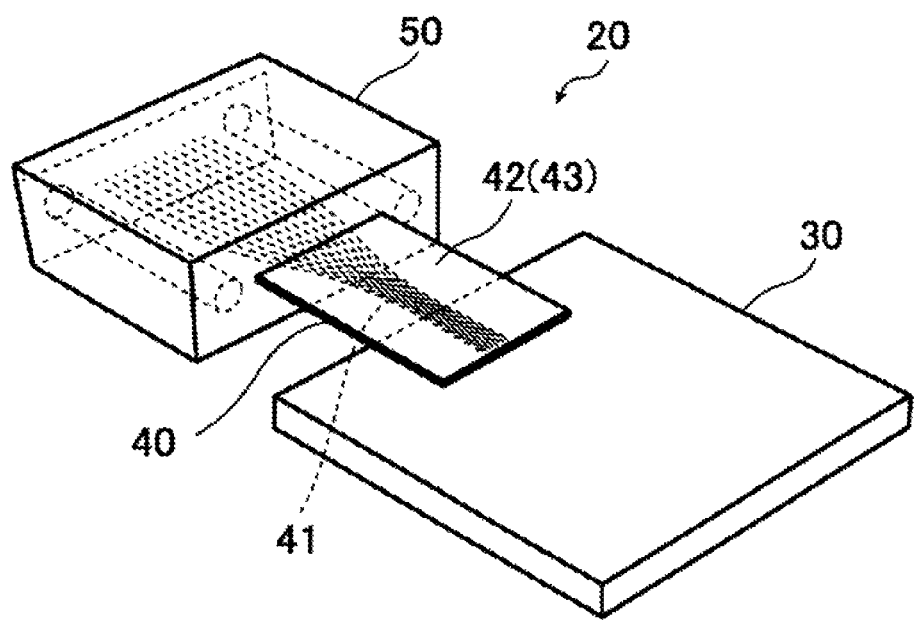
FIG. 4 is a view illustrating another configuration example of the polymer optical waveguide, and is a perspective view illustrating a configuration example of a composite optical waveguide in which the polymer optical waveguide is adiabatically coupled with a silicon optical waveguide.
Figure 5:
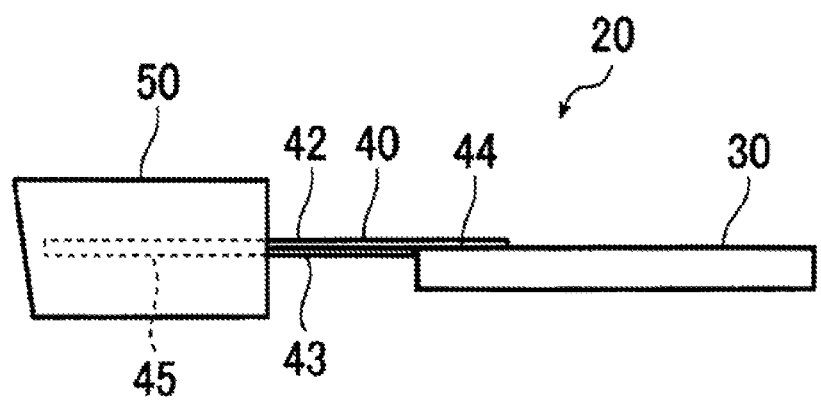
FIG. 5 is a side view of the composite optical waveguide 20 of FIG. 4.

FIG. 4 is a perspective view illustrating a configuration example of a composite optical waveguide in which another configuration example of the polymer optical waveguide of the present invention is adiabatically coupled with a silicon optical waveguide. FIG. 5 is a side view of the composite optical waveguide 20 of FIG. 4.

In the composite optical waveguide 20 illustrated in FIG. 4, the silicon optical waveguide 30 and the polymer optical waveguide 40 are adiabatically coupled with each other. The polymer optical waveguide 40 illustrated in FIG. 4 is similar to the polymer optical waveguide 10 illustrated in FIG. 1 in that a core 41, an under-cladding 42, and an over-cladding 43 are provided and that a coupling section 44 and an optical waveguide section 45 are provided. The polymer optical waveguide 40 illustrated in FIG. 4 is adiabatically coupled with the silicon optical waveguide 30 at the coupling section 44. The optical waveguide section 45 of the polymer optical waveguide 40 is accommodated in a connector 50 for butt coupling (confronting coupling) with a single-mode optical fiber or the like.

Figure 6:
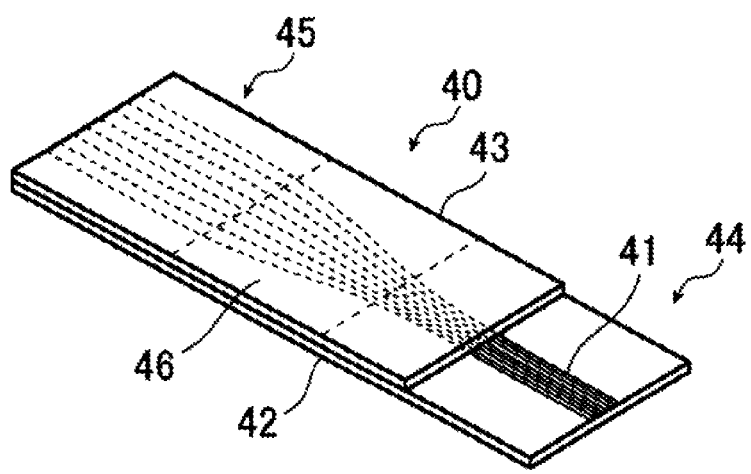
FIG. 6 is a perspective view of the polymer optical waveguide 40 of FIG. 4. Here, the polymer optical waveguide 40 is reversed upside down.

FIG. 6 is a perspective view of the polymer optical waveguide 40 illustrated in FIG. 4. Here, the polymer optical waveguide 40 is reversed upside down.

The polymer optical waveguide 40 illustrated in FIG. 6 includes a plurality of, specifically eight, cores 41 disposed along the light propagation direction. On the optical waveguide section 45 side (one end side) and the coupling section 44 side (the other end side) of the polymer optical waveguide 40, a pitch between the plurality of cores 41 is different. On the optical waveguide section 45 side (one end side), the pitch is preferably 100 μm to 500 μm, and more preferably 125 μm to 250 μm. On the coupling section 44 side (the other end side), the pitch is preferably 20 μm to 200 μm, and more preferably 30 μm to 100 μm. Therefore, the polymer optical waveguide 40 illustrated in FIG. 6 includes a pitch changing region 46 that changes the pitch between the plurality of cores.

In the pitch changing region 46, when a bending radius of the core 41 is large, a distance required for pitch change becomes long, and the polymer optical waveguide 40 becomes large. Therefore, the bending radius of the core 41 is preferably small. Here, as the bending radius of the core 41 is small, a bending loss is increased.

As described above, in portions other than the portion a, the core width of the core 11 is Wa or more. Thus, when the core width in the pitch changing region 46 is denoted Wp (μm), Wp is Wa or more. Wp is preferably 2.2 μm or more because a bending loss of the core 41 in the pitch changing region 46 is reduced. The core width Wp is more preferably 3 μm or more, still more preferably 3.5 μm or more, yet still more preferably 4 μm or more, and particularly preferably 4.5 μm or more.

Here, as the core width Wp in the pitch changing region 46 becomes wide, a mode of light propagating through the core 41 may be disturbed. Therefore, the core width Wp in the pitch changing region 46 is preferably 6 μm or less, more preferably 5.5 μm or less, and still more preferably 5.0 μm or less.

The bending radius of the core 41 in the pitch changing region 46 is not particularly limited. Here, in order to reduce a size of the polymer optical waveguide 40, the bending radius of the core 41 in the pitch changing region 46 is preferably 100 mm or less, more preferably 80 mm or less, still more preferably 50 mm or less, yet still more preferably 30 mm or less, yet still further preferably 20 mm or less, and particularly preferably 12 mm or less.

Here, when the bending radius of the core 41 in the pitch changing region 46 is too small, even though the core width Wp in the pitch changing region 46 satisfies the above-described range, the bending loss of the core 41 may be increased. Therefore, the bending radius of the core 41 in the pitch changing region 46 is preferably 6 mm or more, and more preferably 8 mm or more.

It is not necessary for all the cores disposed along the light propagation direction to satisfy the above-described bending radius, and some of the cores may have a bending radius of more than 100 mm. For example, some of the cores may have a bending radius of 200 mm or more.

Figure 7:
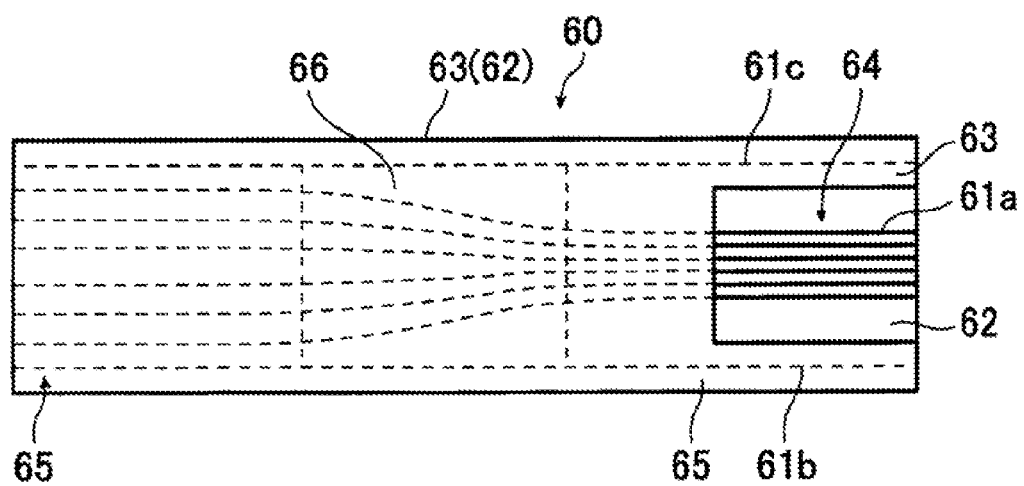
FIG. 7 is a plan view illustrating still another configuration example of the polymer optical waveguide.
Figure 8A:
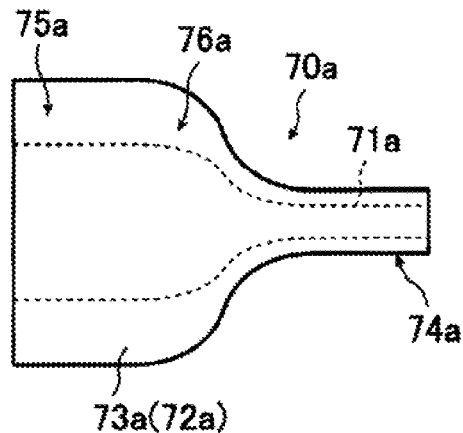
FIG. 8A to FIG. 8E are plan views of still another configuration examples of the polymer optical waveguide.
Figure 8B:
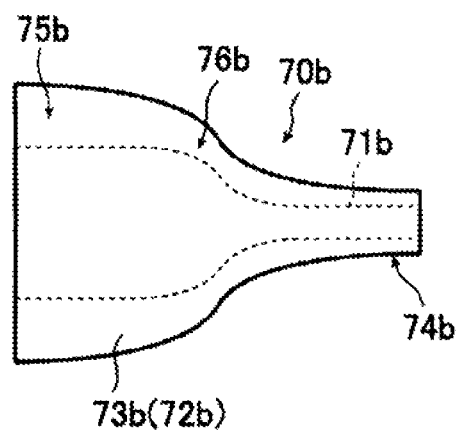
Figure 8C:
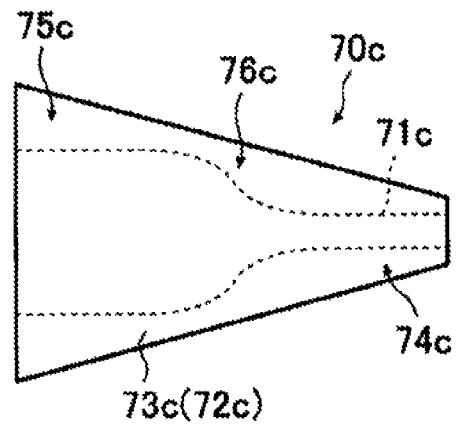
Figure 8D:
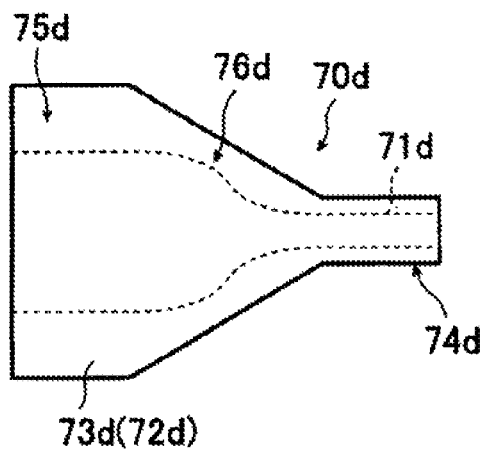
Figure 8E:
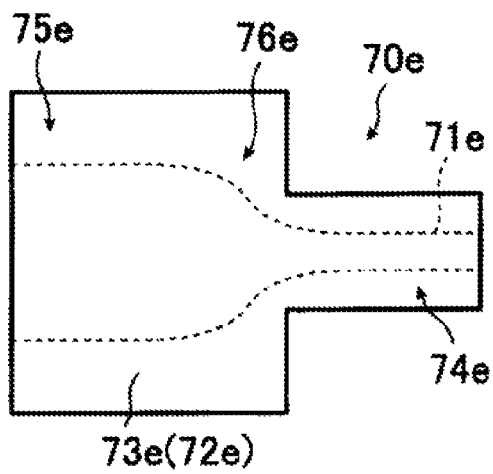

FIG. 7 is a plan view illustrating still another configuration example of the polymer optical waveguide of the present invention. The polymer optical waveguide 60 illustrated in FIG. 7 is similar to the polymer optical waveguide 40 illustrated in FIG. 6 in that (1) a plurality of cores 61a, 61b and 61c disposed along the light propagation direction, an under-cladding 62, and an over-cladding 63 are provided, (2) a coupling section 64 and an optical waveguide section 65 are provided, the coupling section 64 is a section in which the over-cladding 63 is not provided and the cores 61a and the under-cladding 62 around the cores 61a are exposed, and the optical waveguide section 65 is a section in which the cores 61a, 61b and 61c are covered with the under-cladding 62 and the over-cladding 63, (3) a pitch between the plurality of cores 61a is different on the optical waveguide section 65 side (one end side) and the coupling section 64 side (the other end side) of the polymer optical waveguide 60, and (4) a pitch changing region 66 that changes the pitch between the plurality of cores is provided.

Here, the polymer optical waveguide 60 illustrated in FIG. 7 may include only the optical waveguide section 65 without including the coupling section 64 in which some cores 61b and 61c among the plurality of cores 61a, 61b, and 61c and the over-cladding 63 are not provided and the core and the under-cladding 62 around the core are exposed.

The cores 61b and 61c only included in the optical waveguide section are cores for optical measurement, used at the time of inspection such as propagation loss measurement. In the case where the cores 61b and 61c for optical measurement are provided, it is possible to easily perform an inspection such as propagation loss measurement. The cores 61b and 61c for optical measurement may have the same pitch between the plurality of cores 61b and 61c on one end side and the other end side, or may include a pitch changing region that changes the pitch between the plurality of cores 61b and 61c.

FIG. 8A to FIG. 8E are plan views of still another configuration examples of the polymer optical waveguide of the present invention. The polymer optical waveguides 70a to 70e illustrated in FIG. 8A to FIG. 8E include cores 71a to 71e, under-claddings 72a to 72e, and over-claddings 73a to 73e, respectively. Here, regarding the cores 71a to 71e, FIG. 8A to FIG. 8E indicate outermost two cores only, among a plurality of cores disposed along the light propagation direction. In FIG. 8A to FIG. 8E, the right side corresponds to the coupling sections 74a to 74e in which the over-cladding is not provided and the cores and the under-cladding around the cores are exposed, and the left side corresponds to the optical waveguide sections 75a to 75e in which the cores are covered with the under-cladding and the over-cladding, respectively. The polymer optical waveguides 70a to 70e include pitch changing regions 76a to 76e, which change the pitch between the plurality of cores, between the optical waveguide sections 75a to 75e and the coupling sections 74a to 74e, respectively.

As in the polymer optical waveguide 40 illustrated in FIG. 6, in the case where a planar shape of the polymer optical waveguide 40 is a rectangular shape, on the coupling section 44 side on which the pitch between the plurality of cores 41 is narrow, there is a wide area in which only the under-cladding 42 is provided, outside the outermost core 41. In the pitch changing region 46 adjacent to the coupling section 44, there is also a wide area in which only the under-cladding 42 and the over-cladding 43 are provided, outside the outermost core 41. These areas may not be present because they do not contribute to light propagation in the polymer optical waveguide 40.

In the polymer optical waveguides 70a to 70e illustrated in FIG. 8A to FIG. 8E, portions of the under-claddings 72a to 72e on the coupling sections 74a to 74e side, which are outside the outermost cores 71a to 71e, are removed by punching, respectively. Portions of the under-claddings 72a to 72e and the over-claddings 73a to 73e of the pitch changing regions 76a to 76e adjacent to the coupling sections 74a to 74e, which are outside the outermost cores 71a to 71e, are also removed by punching, respectively. Using a polymer optical waveguide having such a shape can reduce the size of a silicon chip.

The polymer optical waveguide of the present invention will be further described.

(Core)

In the polymer optical waveguide of the present invention, the shape of the end surface of the core is not limited to the illustrated quadrilateral shape. The shape of the end surface of the core (in the polymer optical waveguide, the shape of the cross-section of the core perpendicular to the light propagation direction of the polymer optical waveguide) may be a trapezoidal shape, a circular shape or an elliptical shape. Furthermore, in the case where the shape of the end surface of the core is a polygon such as a rectangle, a substantially square or a trapezoid, the corner of the shape may be rounded. In the case where the shape of the end surface of the core is a shape other than a rectangle and a substantially square, the core width Wa and the core height Ha in the portion a are respectively an average value of the core widths and an average value of the core heights in the shape of the corresponding end surface, and the core width Ws in the coupling section is an average value of the core widths in the shape of the corresponding end surface.

The core may have a refractive index distribution inside. In this case, the core may have a refractive index distribution in which the refractive index is reduced toward the distal side from the center. Also, the core may have a refractive index distribution in which the refractive index on the over-cladding side is high and the refractive index on the under-cladding side is low, or may have a refractive index distribution in which the refractive index on the over-cladding side is low and the refractive index on the under-cladding side is high.

(Under-Cladding and Over-Cladding)

Each of the under-cladding and the over-cladding has a refractive index lower than the refractive index of the core. Each of the under-cladding and the over-cladding may have a uniform refractive index, or may have portions having different refractive indexes on the proximal side and the distal side from the core. In the latter case, the refractive index may be decreased toward the distal side from the core, or the refractive index may be increased toward the distal side from the core.

In the polymer optical waveguide of the present invention, a relative refractive index difference u between the core and the under-cladding and a relative refractive index difference o between the core and the over-cladding are preferably both 0.006 to 0.017, because the polymer optical waveguide can be connected to the single-mode optical fiber with a lower loss and, in the case where the polymer optical waveguide includes a pitch changing region, a bending loss in the pitch changing region can be reduced. Both of the relative refractive index difference u between the core and the under-cladding and the relative refractive index difference o between the core and the over-cladding are more preferably 0.007 to 0.015, still more preferably 0.008 to 0.012, and yet still more preferably 0.008 to 0.011.

The relative refractive index difference u between the core and the under-cladding is obtained by using the refractive index of the core and the refractive index of the under-cladding as follows.

Relative refractive index difference $u$=(refractive index of core−refractive index of under-cladding)/refractive index of under-cladding The relative refractive index difference o between the core and the over-cladding is obtained by using the refractive index of the core and the refractive index of the over-cladding as follows.

Relative refractive index difference $o$=(refractive index of core−refractive index of over-cladding)/refractive index of over-cladding As described above, in the case where the core has a refractive index distribution inside, or in the case where the under-cladding or the over-cladding includes portions having different refractive indexes on the proximal side and the distal side from the core, the relative refractive index difference u between the core and the under-cladding, and the relative refractive index difference o between the core and the over-cladding are obtained by using an average refractive index of the core and refractive indexes of the under-cladding and the over-cladding on the proximal side from the core.

The reason why the relative refractive index difference u between the core and the under-cladding, and the relative refractive index difference o between the core and the over-cladding are separately described above is because the case where the refractive index of the under-cladding is not the same as that of the over-cladding is acceptable.

In the polymer optical waveguide of the present invention, an absolute value of the relative refractive index difference between the under-cladding and the over-cladding is preferably 0.001 or less, because the polymer optical waveguide can be connected to a single-mode optical fiber with a lower loss and, in the case where the polymer optical waveguide includes a pitch changing region, a bending loss in the pitch changing region can be further reduced. The absolute value of the relative refractive index difference between the under-cladding and the over-cladding is preferably 0.0009 or less, more preferably 0.0008 or less, and still more preferably 0.0006 or less.

The thicknesses of the under-cladding and the over-cladding are not particularly limited. In the case where the polymer optical waveguide of the present invention is a single-mode optical waveguide, propagating light may leak to a cladding portion within a range of approximately 10 μm from the center of the core. For this reason, from a viewpoint of reducing the propagation loss of light, the thicknesses of each of the under-cladding and the over-cladding is preferably 10 μm or more. Furthermore, the total thickness of the under-cladding and the over-cladding is preferably 20 μm to 100 μm, and more preferably 30 μm to 80 μm.

(Coupling Section)

Preferably, the coupling section of the polymer optical waveguide of the present invention has a length which is enough for use as a connection portion with a silicon optical waveguide. Specifically, the length of the coupling section in the light propagation direction of the polymer optical waveguide is preferably 100 μm or more, more preferably 300 μm or more, still more preferably 500 μm or more, and yet still more preferably 1,000 μm or more.

Here, in the case where the length of the coupling section in the light propagation direction of the polymer optical waveguide is too long, when connecting the polymer optical waveguide and the silicon optical waveguide by using an adhesive (e.g., an epoxy resin), a connection loss may increase due to absorption by the adhesive. Therefore, the length of the coupling section in the light propagation direction of the polymer optical waveguide is preferably 10,000 μm or less, more preferably 5,000 μm or less, and still more preferably 3,000 μm or less.

(Material)

In the polymer optical waveguide of the present invention, materials of the core, the under-cladding and the over-cladding are not particularly limited as long as they satisfy required characteristics of the polymer optical waveguide. On the other hand, the core is preferably made of a polymer containing fluorine from a viewpoint of reducing a loss of light propagating through the core.

The under-cladding may be made of the same material as or a different material from that of the over-cladding.

(Manufacturing Method)

A method of manufacturing the polymer optical waveguide of the present invention is not particularly limited, and various method may be used. Specifically, a duplication (stamper) method, a direct exposure method, a method of combining a reactive ion-etching (RIE) method with a photolithography process, a method based on injection-molding, a photobleaching method, a direct-drawing method, a self-formation method, and the like may be used.

An example of the method of manufacturing the polymer optical waveguide of the present invention will be described.

First, a coating liquid containing a curable composition (A), which is a material of an under-cladding, is applied onto a substrate by spin-coating. Subsequently, the curable composition (A) is cured to form an under-cladding.

Next, a coating liquid containing a curable composition (B), which is a material of cores, is applied onto the under-cladding by spin-coating. Subsequently, the curable composition (B) is patterned by a photolithography process to form cores on the under-cladding. At this time, in order to form a shape in which the widths of the cores are different along the light propagation direction, the cores may be formed by performing exposure by using a photomask having a shape in which the widths of the cores are different along the light propagation direction and then, performing developing. After forming the cores, post-baking may be performed as necessary.

Next, a coating liquid containing a curable composition (C), which is a material of an over-cladding, is applied onto the under-cladding and the cores by spin-coating. Subsequently, the curable composition (C) is cured to form an over-cladding. When forming the over-cladding, a coupling section, in which the over-cladding is not provided and the cores and the under-cladding around the cores are exposed, can be formed by a photolithography process.

EXAMPLES

The present invention will be described in more detail below with reference to the following Examples. However, the present invention is not limited to these Examples.

Reference Examples 1 and 2

In Reference Examples 1 and 2, polymer optical waveguides were manufactured by the above-described procedure, and peeling of the core film was evaluated. Here, in the polymer optical waveguides of Reference Examples 1 and 2, all portions of the core and the under-cladding are covered with the over-cladding, and the core width was constant in all portions of the core. The core width Wa, the core height Ha, and Ha/Wa in Reference Examples 1 and 2 are as follows.

Reference Example 1

Core width Wa: 2.0 µm
Core height Ha: 2.0 µm
Ha/Wa: 1.00

Reference Example 2

Core width Wa: 1.8 µm
Core height Ha: 2.5 µm
Ha/Wa: 1.39

The manufactured polymer optical waveguides were observed with an optical microscope. As a result, in Reference Example 1 in which Ha satisfies a range of 1.3 µm or more and 2.3 µm or less and Ha/Wa is 1.15 or less, peeling of the core film was not confirmed. On the other hand, in Reference Example 2 in which Ha does not satisfy a range of 1.3 µm or more and 2.3 µm or less and Ha/Wa exceeds 1.15, peeling of the core film was confirmed.

In Examples to be described below, BeamPROP (manufactured by RSoft Design Group), which is a simulation engine and is optical fiber/waveguide design and analysis software based on a bidirectional BPM method, was used. For light having a center wavelength shown in the table below, light propagation in a TE mode and a TM mode was simulated by a finite difference beam propagation method.

Example 1-1 to Example 1-13

A simulation analysis of a connection loss in an adiabatic connection portion between the polymer optical waveguide and a silicon optical waveguide was performed. For an evaluation model, an adiabatic connection portion between the polymer optical waveguide and the silicon optical waveguide, that is, an adiabatic connection portion between a coupling portion of the polymer optical waveguide and the silicon optical waveguide, was used. For convenience of the simulation analysis, used was the polymer optical waveguide having a structure including an optical waveguide section having a short length on the other end side of the adiabatic connection portion.

Figure 9:
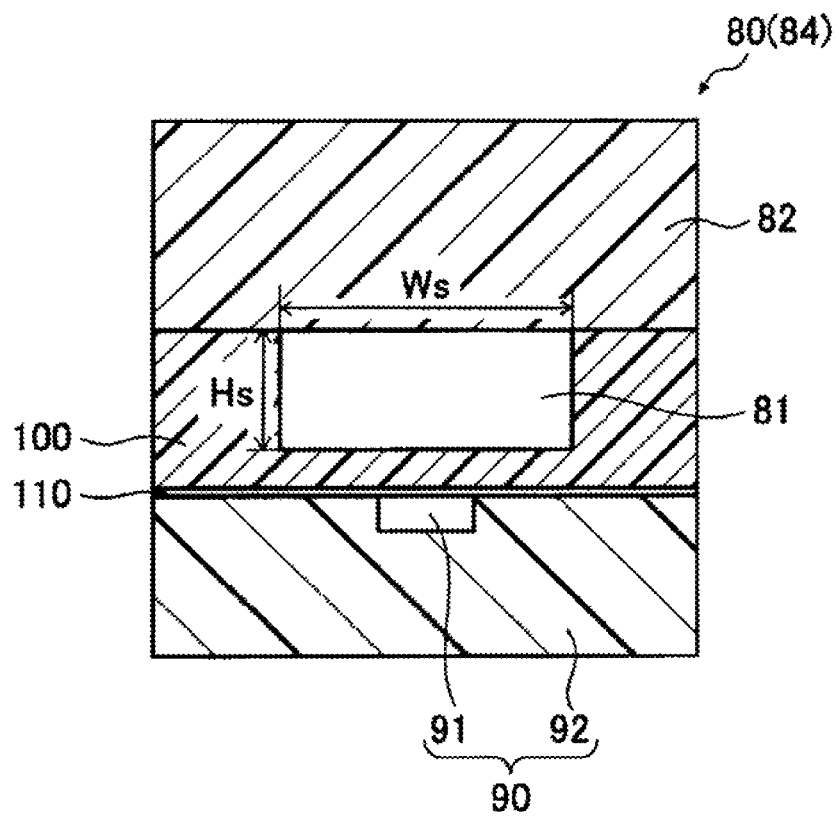
FIG. 9 is a vertical sectional view illustrating an evaluation model when a simulation analysis of a connection loss in an adiabatic coupling section between the polymer optical waveguide and a silicon optical waveguide was performed in Example 1-1 to Example 1-9.
Figure 10:
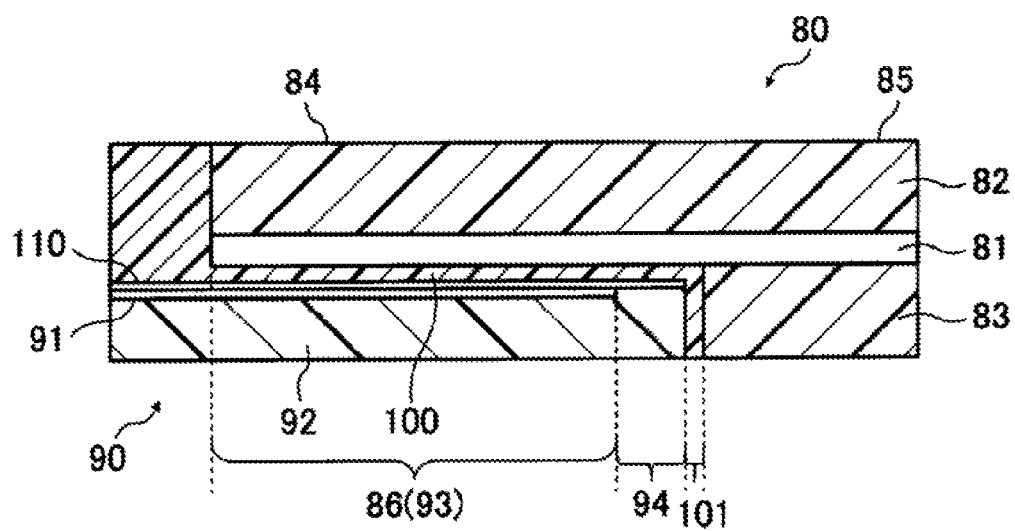
FIG. 10 is a horizontal sectional view illustrating the evaluation model of FIG. 9.

FIG. 9 is a vertical sectional view illustrating an evaluation model used for the simulation analysis, and FIG. 10 is a horizontal sectional view of the evaluation model.

FIG. 9 illustrates a coupling section 84 of a polymer optical waveguide 80. Thus, only a core 81 and an under-cladding 82 of the polymer optical waveguide 80 are illustrated. A silicon optical waveguide 90 illustrated in FIG. 9 includes a core 91 and a cladding 92. As illustrated in FIG. 10, an optical waveguide section 85 of the polymer optical waveguide 80 includes a core 81, an under-cladding 82 and an over-cladding 83.

In FIG. 9, the core 81 of the polymer optical waveguide 80 and the core 91 of the silicon optical waveguide 90 are arranged so as to face each other, and are bonded to each other by an adhesive 100. A barrier layer 110 is formed on a surface of the silicon optical waveguide 90 on the adhesive 100 side.

Each structure in the evaluation model is as follows.
<Polymer Optical Waveguide 80>
(Core 81)
  Core width Ws: (as shown in the table below)
  Core height Hs: (as shown in the table below)
  Refractive index: (as shown in the table below)
  Length of adiabatic coupling section 86: 1,750 µm
(Under-Cladding 82)
  Thickness: 15 µm
  Length: 3,050 µm
  Refractive index: (as shown in the table below)
(Over-Cladding 83)
  Thickness: 15 µm
  Length: 1,000 µm
  Refractive index: (as shown in the table below)
<Silicon Optical Waveguide 90>
(Core 91)
  Width: configuration where the width narrows from 0.35 µm to 0.07 µm according to a quadratic function from the opposite side of the polymer optical waveguide 80 to the optical waveguide section 85 of the polymer optical waveguide 80.
  Height: 0.16 µm
  Refractive index: 3.45
  Length of adiabatic coupling section 93: 1,750 µm
(Cladding 92)
  Thickness 15 µm
  Refractive index 1.45
  Length of region 94 in which only the cladding 92 is provided: 250 µm
<Adhesive 100>
  Resin thickness (distance between surfaces on which the core 81 of the polymer optical waveguide 80 and the core 91 of the silicon optical waveguide 90 face each other): 0.5 µm
  Refractive index: 1.51
  Length of region 101 between the silicon optical waveguide 90 and the optical waveguide section 85 of the polymer optical waveguide 80: 50 µm
<Barrier Layer 110>
  Thickness: 0.03 µm
  Refractive index: 1.989

Results of the simulation analysis are shown in the table below.

TABLE 1

|  | EXAMPLE 1-1 | EXAMPLE 1-2 | EXAMPLE 1-3 | EXAMPLE 1-4 | EXAMPLE 1-5 | EXAMPLE 1-6 | EXAMPLE 1-7 | EXAMPLE 1-8 | EXAMPLE 1-9 |
|---|---|---|---|---|---|---|---|---|---|
| core width Ws (µm) | 4.5 | 5.0 | 6.0 | 4.75 | 4.75 | 4.75 | 4.75 | 4.75 | 4.75 |
| core height Hs (µm) | 2.1 | 2.1 | 2.1 | 2.0 | 2.2 | 2.1 | 2.1 | 2.1 | 2.1 |
| Hs/Ws | 0.47 | 0.42 | 0.35 | 0.42 | 0.46 | 0.44 | 0.44 | 0.44 | 0.44 |
| refractive index (core) | 1.53 | 1.53 | 1.53 | 1.53 | 1.53 | 1.53 | 1.53 | 1.53 | 1.53 |
| refractive index (under-cladding) | 1.516 | 1.516 | 1.516 | 1.516 | 1.516 | 1.518 | 1.515 | 1.518 | 1.515 |
| refractive index (over-cladding) | 1.516 | 1.516 | 1.516 | 1.516 | 1.516 | 1.518 | 1.515 | 1.518 | 1.515 |

TABLE 1-continued

|  | EXAMPLE 1-1 | EXAMPLE 1-2 | EXAMPLE 1-3 | EXAMPLE 1-4 | EXAMPLE 1-5 | EXAMPLE 1-6 | EXAMPLE 1-7 | EXAMPLE 1-8 | EXAMPLE 1-9 |
|---|---|---|---|---|---|---|---|---|---|
| relative refractive index difference between core and cladding | 0.009 | 0.009 | 0.009 | 0.009 | 0.009 | 0.008 | 0.010 | 0.008 | 0.010 |
| refractive index difference between under-cladding and over-cladding | 0.000 | 0.000 | 0.000 | 0.000 | 0.000 | 0.000 | 0.000 | 0.000 | 0.000 |
| wavelength (μm) | 1.31 | 1.31 | 1.31 | 1.31 | 1.31 | 1.31 | 1.31 | 1.27 | 1.35 |
| connection loss TE (dB) | 0.18 | 0.17 | 0.17 | 0.19 | 0.16 | 0.28 | 0.12 | 0.12 | 0.26 |
| connection loss TM (dB) | 0.31 | 0.28 | 0.25 | 0.33 | 0.27 | 0.48 | 0.23 | 0.32 | 0.31 |

TABLE 2

|  | EXAMPLE 1-10 | EXAMPLE 1-11 | EXAMPLE 1-12 | EXAMPLE 1-13 |
|---|---|---|---|---|
| core width Ws (μm) | 5.50 | 4.00 | 8.00 | 4.00 |
| core height Hs (μm) | 1.3 | 4.0 | 2.0 | 1.5 |
| Hs/Ws | 0.24 | 1.00 | 0.25 | 0.38 |
| refractive index (core) | 1.53 | 1.53 | 1.53 | 1.53 |
| refractive index (under-cladding) | 1.510 | 1.516 | 1.521 | 1.504 |
| refractive index (over-cladding) | 1.510 | 1.516 | 1.521 | 1.504 |
| relative refractive index difference between core and cladding | 0.013 | 0.009 | 0.006 | 0.017 |
| refractive index difference between under-cladding and over-cladding | 0.000 | 0.000 | 0.000 | 0.000 |
| wavelength (μm) | 1.31 | 1.31 | 1.31 | 1.31 |
| connection loss TE (dB) | 0.27 | 0.38 | 0.86 | 0.54 |
| connection loss TM (dB) | — | — | — | — |

In Example 1-1 to Example 1-13 in which the core height Hs satisfied the range of 1.3 μm or more and 4.5 μm or less and Ws satisfies the range of 3 μm or more and 8 μm or less, in all cases, the connection loss in the adiabatic connection portion between the polymer optical waveguide and the silicon optical waveguide was small.

Example 2-1 to Example 2-29

A simulation analysis of a bending loss in the pitch changing region of the polymer optical waveguide was performed. For an evaluation model, in order to simulate the pitch changing region of the polymer optical waveguide in a pseudo manner, used was the polymer optical waveguide including one core, which is curved with a constant curvature radius in a horizontal direction.

Figure 11:
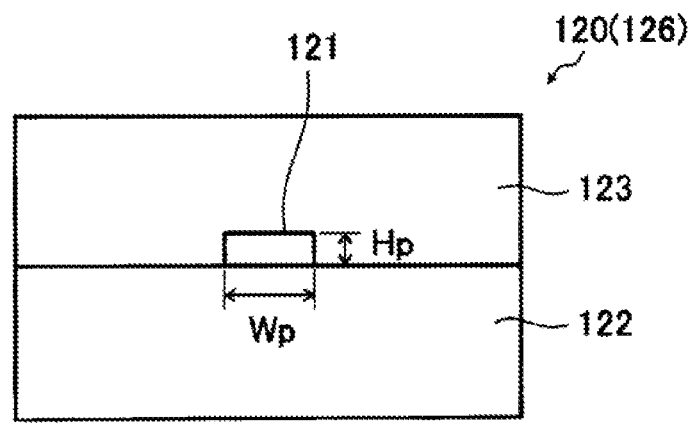
FIG. 11 is a view illustrating an end surface of an evaluation model when a simulation analysis of a bending loss of the polymer optical waveguide was performed in Example 2-1 to Example 2-25.

FIG. 11 is a view illustrating an end surface of the evaluation model used in the simulation analysis. FIG. 11 illustrates, as a pseudo pitch changing region of a polymer optical waveguide 120, a curved core portion 126 in which a core 121 curving with a constant curvature radius in a horizontal direction is covered with an under-cladding 122 and an over-cladding 123.

Each structure in the evaluation model is as follows.
<Polymer Optical Waveguide 120>
(Core 121)
 Core width Wp: (as shown in the table below)
 Core height Hp: (as shown in the table below)
 Refractive index: (as shown in the table below)
 Length: 3,000 μm
 Curvature radius R: (as shown in the table below)
(Under-Cladding 122)
 Thickness: 15 μm
 Length: 3,000 μm
 Refractive index: (as shown in the table below)
(Over-Cladding 123)
 Thickness: 15 μm
 Length: 3,000 μm
 Refractive index: (as shown in the table below)

Results of the simulation analysis are shown in the table below. In Example in which the refractive index of the under-cladding was different from that of the over-cladding, the relative refractive index difference between the core and the cladding was indicated by using an average value of the refractive index of the under-cladding and the refractive index of the over-cladding, as the refractive index of the cladding.

TABLE 3

|  | EXAMPLE 2-1 | EXAMPLE 2-2 | EXAMPLE 2-3 | EXAMPLE 2-4 | EXAMPLE 2-5 | EXAMPLE 2-6 | EXAMPLE 2-7 | EXAMPLE 2-8 |
|---|---|---|---|---|---|---|---|---|
| core width Wp (μm) | 3.0 | 4.0 | 4.0 | 4.0 | 5.0 | 6.0 | 4.0 | 4.5 |
| core height Hp (μm) | 2.0 | 2.0 | 2.0 | 2.0 | 2.0 | 2.0 | 2.0 | 2.0 |
| Hp/Wp | 0.67 | 0.50 | 0.50 | 0.50 | 0.40 | 0.33 | 0.50 | 0.44 |
| refractive index (core) | 1.53 | 1.53 | 1.53 | 1.53 | 1.53 | 1.53 | 1.53 | 1.53 |
| refractive index (under-cladding) | 1.516 | 1.518 | 1.516 | 1.515 | 1.516 | 1.516 | 1.516 | 1.518 |
| refractive index (over-cladding) | 1.516 | 1.518 | 1.516 | 1.515 | 1.516 | 1.516 | 1.516 | 1.518 |

TABLE 3-continued

|  | EXAMPLE 2-1 | EXAMPLE 2-2 | EXAMPLE 2-3 | EXAMPLE 2-4 | EXAMPLE 2-5 | EXAMPLE 2-6 | EXAMPLE 2-7 | EXAMPLE 2-8 |
| --- | --- | --- | --- | --- | --- | --- | --- | --- |
| relative refractive index difference between core and cladding | 0.009 | 0.008 | 0.009 | 0.010 | 0.009 | 0.009 | 0.009 | 0.008 |
| refractive index difference between under-cladding and over-cladding | 0.000 | 0.000 | 0.000 | 0.000 | 0.000 | 0.000 | 0.000 | 0.000 |
| wavelength (μm) | 1.31 | 1.31 | 1.31 | 1.31 | 1.31 | 1.31 | 1.35 | 1.35 |
| bending radius R (mm) | 10 | 10 | 10 | 10 | 10 | 10 | 10 | 10 |
| bending loss TE (dB/cm) | 0.19 | 0.09 | 0.00 | 0.00 | 0.00 | 0.00 | 0.01 | 0.07 |
| bending loss TM (dB/cm) | — | — | — | — | — | — | — | — |

TABLE 4

|  | EXAMPLE 2-9 | EXAMPLE 2-10 | EXAMPLE 2-11 | EXAMPLE 2-12 | EXAMPLE 2-13 | EXAMPLE 2-14 | EXAMPLE 2-15 | EXAMPLE 2-16 |
| --- | --- | --- | --- | --- | --- | --- | --- | --- |
| core width Wp (μm) | 4.5 | 2.5 | 2.5 | 2.5 | 2.5 | 3.0 | 3.0 | 2.0 |
| core height Hp (μm) | 2.0 | 2.0 | 2.0 | 2.0 | 2.0 | 2.0 | 2.0 | 2.0 |
| Hp/Wp | 0.44 | 0.80 | 0.80 | 0.80 | 0.80 | 0.67 | 0.67 | 1.00 |
| refractive index (core) | 1.53 | 1.53 | 1.53 | 1.53 | 1.53 | 1.53 | 1.53 | 1.53 |
| refractive index (under-cladding) | 1.515 | 1.516 | 1.516 | 1.516 | 1.516 | 1.516 | 1.516 | 1.516 |
| refractive index (over-cladding) | 1.515 | 1.516 | 1.516 | 1.516 | 1.516 | 1.516 | 1.516 | 1.516 |
| relative refractive index difference between core and cladding | 0.010 | 0.009 | 0.009 | 0.009 | 0.009 | 0.009 | 0.009 | 0.009 |
| refractive index difference between under-cladding and over-cladding | 0.000 | 0.000 | 0.000 | 0.000 | 0.000 | 0.000 | 0.000 | 0.000 |
| wavelength (μm) | 1.35 | 1.31 | 1.31 | 1.31 | 1.31 | 1.31 | 1.31 | 1.31 |
| bending radius R (mm) | 10 | 15 | 20 | 30 | 50 | 15 | 50 | 10 |
| bending loss TE (dB/cm) | 0.00 | 0.22 | 0.02 | 0.02 | 0.03 | 0.01 | 0.02 | 16.46 |
| bending loss TM (dB/cm) | — | 0.23 | 0.02 | 0.02 | 0.03 | 0.01 | 0.02 | — |

TABLE 5

|  | EXAMPLE 2-17 | EXAMPLE 2-18 | EXAMPLE 2-19 | EXAMPLE 2-20 | EXAMPLE 2-21 | EXAMPLE 2-22 | EXAMPLE 2-23 | EXAMPLE 2-24 | EXAMPLE 2-25 |
| --- | --- | --- | --- | --- | --- | --- | --- | --- | --- |
| core width Wp (μm) | 2.0 | 4.0 | 4.0 | 4.0 | 4.0 | 4.0 | 4.0 | 4.75 | 4.75 |
| core height Hp (μm) | 2.0 | 2.0 | 2.0 | 2.0 | 2.0 | 2.0 | 2.0 | 1.9 | 2.1 |
| Hp/Wp | 1.00 | 0.50 | 0.50 | 0.50 | 0.50 | 0.50 | 0.50 | 0.40 | 0.44 |
| refractive index (core) | 1.53 | 1.53 | 1.53 | 1.53 | 1.53 | 1.53 | 1.53 | 1.53 | 1.53 |
| refractive index (under-cladding) | 1.516 | 1.518 | 1.517 | 1.515 | 1.518 | 1.517 | 1.515 | 1.518 | 1.515 |
| refractive index (over-cladding) | 1.516 | 1.517 | 1.516 | 1.514 | 1.517 | 1.516 | 1.514 | 1.517 | 1.514 |
| relative refractive index difference between core and cladding | 0.009 | 0.008 | 0.009 | 0.010 | 0.008 | 0.009 | 0.010 | 0.008 | 0.010 |

TABLE 5-continued

|  | EXAMPLE 2-17 | EXAMPLE 2-18 | EXAMPLE 2-19 | EXAMPLE 2-20 | EXAMPLE 2-21 | EXAMPLE 2-22 | EXAMPLE 2-23 | EXAMPLE 2-24 | EXAMPLE 2-25 |
|---|---|---|---|---|---|---|---|---|---|
| refractive index difference between under-cladding and over-cladding | 0.000 | 0.001 | 0.001 | 0.001 | 0.001 | 0.001 | 0.001 | 0.001 | 0.001 |
| wavelength (μm) | 1.31 | 1.31 | 1.31 | 1.31 | 1.35 | 1.35 | 1.35 | 1.35 | 1.35 |
| bending radius R (mm) | 20 | 10 | 10 | 10 | 10 | 10 | 10 | 10 | 10 |
| bending loss TE (dB/cm) | 1.78 | 0.18 | 0.00 | 0.00 | 0.52 | 0.02 | 0.00 | 0.19 | 0.00 |
| bending loss TM (dB/cm) | 1.77 | — | — | — | 0.57 | 0.02 | 0.00 | 0.22 | 0.00 |

TABLE 6

|  | EXAMPLE 2-26 | EXAMPLE 2-27 | EXAMPLE 2-28 | EXAMPLE 2-29 |
|---|---|---|---|---|
| core width Wp (μm) | 4.0 | 4.0 | 4.0 | 4.5 |
| core height Hp (μm) | 2.0 | 3.4 | 1.3 | 4.1 |
| Hp/Wp | 0.50 | 0.85 | 0.33 | 0.91 |
| refractive index (core) | 1.53 | 1.53 | 1.53 | 1.53 |
| refractive index (under-cladding) | 1.504 | 1.521 | 1.512 | 1.516 |
| refractive index (over-cladding) | 1.504 | 1.521 | 1.512 | 1.516 |
| relative refractive index difference between core and cladding | 0.017 | 0.006 | 0.012 | 0.009 |
| refractive index difference between under-cladding and over-cladding | 0.000 | 0.000 | 0.000 | 0.000 |
| wavelength (μm) | 1.31 | 1.31 | 1.31 | 1.31 |
| bending radius R (mm) | 10 | 10 | 10 | 10 |
| bending loss TE (dB/cm) | 0.00 | 0.02 | 0.00 | 0.00 |
| bending loss TM (dB/cm) | — | — | — | — |

In each of Example 2-1 to Example 2-15 and Example 2-18 to Example 2-29 in which the core width Wp in the curved core portion 126 satisfied the range of 2.2 μm or more and 6 μm or less, in all cases, the bending loss was small. On the other hand, in Example 2-16 and Example 2-17 in which the core width Wp in the curved core portion 126 was less than 2.2 μm, the bending loss was large. In Example 2-18 to Example 2-25, although the under-cladding had a different refractive index from that of the over-cladding, the bending loss was small because a difference between the refractive indexes of the under-cladding and the over-cladding was 0.001 or less.

Example 3-1 to Example 3-39

A simulation analysis of a connection loss of a confronting (butt) connection portion between the polymer optical waveguide and a single-mode optical fiber was performed. For an evaluation model, a confronting (butt) connection portion between the polymer optical waveguide and the single-mode optical fiber, that is, a confronting (butt) connection portion between the optical waveguide section of the polymer optical waveguide and the single-mode optical fiber, was used.

Figure 12:
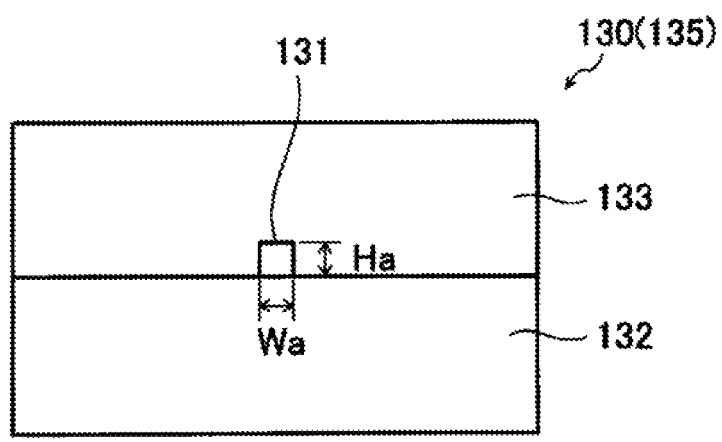
FIG. 12 is a view illustrating an end surface of an evaluation model of the polymer optical waveguide when a simulation analysis of a connection loss in a butt coupling (confronting coupling) section between the polymer optical waveguide and a single-mode optical fiber was performed in Example 3-1 to Example 3-34.

FIG. 12 is a view illustrating an end surface of the evaluation model of the polymer optical waveguide used in the simulation analysis. FIG. 12 illustrates the optical waveguide section 135 of the polymer optical waveguide 130 in which the core 131 is covered with the under-cladding 132 and the over-cladding 133.

<Polymer Optical Waveguide 130>
(Core 131)
  Core width Wa: (as shown in the table below)
  Core height Ha: (as shown in the table below)
  Refractive index: (as shown in the table below)
  Length: 3,000 μm
(Under-Cladding 132)
  Thickness: 15 μm
  Length: 3,000 μm
  Refractive index: (as shown in the table below)
(Over-Cladding 133)
  Thickness: 15 μm
  Length: 3,000 μm
  Refractive index: (as shown in the table below)
<Single-Mode Optical Fiber>
  Core diameter: 8.4 μm
  Core refractive index: 1.47
  Cladding refractive index: 1.4652

Results of the simulation analysis are shown in the table below. In Example in which the refractive index of the under-cladding was different from that of the over-cladding, the relative refractive index difference between the core and the cladding was indicated by using an average value of the refractive index of the under-cladding and the refractive index of the over-cladding, as the refractive index of the cladding.

TABLE 7

|  | EXAMPLE 3-1 | EXAMPLE 3-2 | EXAMPLE 3-3 | EXAMPLE 3-4 | EXAMPLE 3-5 | EXAMPLE 3-6 | EXAMPLE 3-7 | EXAMPLE 3-8 |
|---|---|---|---|---|---|---|---|---|
| core width Wa (μm) | 2.4 | 2.0 | 2.4 | 2.0 | 2.4 | 1.8 | 2.2 | 2.6 |
| core height Ha (μm) | 1.4 | 1.4 | 1.4 | 1.4 | 1.4 | 1.6 | 1.6 | 1.6 |
| Ha/Wa | 0.58 | 0.70 | 0.58 | 0.70 | 0.58 | 0.89 | 0.73 | 0.62 |
| refractive index (core) | 1.53 | 1.53 | 1.53 | 1.53 | 1.53 | 1.53 | 1.53 | 1.53 |

TABLE 7-continued

| | EXAMPLE 3-1 | EXAMPLE 3-2 | EXAMPLE 3-3 | EXAMPLE 3-4 | EXAMPLE 3-5 | EXAMPLE 3-6 | EXAMPLE 3-7 | EXAMPLE 3-8 |
|---|---|---|---|---|---|---|---|---|
| refractive index (under-cladding) | 1.518 | 1.516 | 1.516 | 1.515 | 1.515 | 1.518 | 1.518 | 1.518 |
| refractive index (over-cladding) | 1.518 | 1.516 | 1.516 | 1.515 | 1.515 | 1.518 | 1.518 | 1.518 |
| relative refractive index difference between core and cladding | 0.008 | 0.009 | 0.009 | 0.010 | 0.010 | 0.008 | 0.008 | 0.008 |
| refractive index difference between under-cladding and over-cladding | 0.000 | 0.000 | 0.000 | 0.000 | 0.000 | 0.000 | 0.000 | 0.000 |
| wavelength (μm) | 1.31 | 1.31 | 1.31 | 1.31 | 1.31 | 1.31 | 1.31 | 1.31 |
| connection loss TE (dB) | 0.60 | 0.68 | 0.35 | 0.41 | 0.27 | 0.58 | 0.29 | 0.29 |
| connection loss TM (dB) | — | — | — | — | — | — | — | — |

TABLE 8

| | EXAMPLE 3-9 | EXAMPLE 3-10 | EXAMPLE 3-11 | EXAMPLE 3-12 | EXAMPLE 3-13 | EXAMPLE 3-14 | EXAMPLE 3-15 | EXAMPLE 3-16 |
|---|---|---|---|---|---|---|---|---|
| core width Wa (μm) | 2.0 | 2.4 | 2.0 | 2.4 | 2.0 | 2.4 | 1.8 | 2.2 |
| core height Ha (μm) | 1.8 | 1.8 | 1.8 | 1.8 | 1.8 | 1.8 | 2 | 2 |
| Ha/Wa | 0.90 | 0.75 | 0.90 | 0.75 | 0.90 | 0.75 | 1.11 | 0.91 |
| refractive index (core) | 1.53 | 1.53 | 1.53 | 1.53 | 1.53 | 1.53 | 1.53 | 1.53 |
| refractive index (under-cladding) | 1.518 | 1.518 | 1.516 | 1.516 | 1.515 | 1.515 | 1.516 | 1.516 |
| refractive index (over-cladding) | 1.518 | 1.518 | 1.516 | 1.516 | 1.515 | 1.515 | 1.516 | 1.516 |
| relative refractive index difference between core and cladding | 0.008 | 0.008 | 0.009 | 0.009 | 0.010 | 0.010 | 0.009 | 0.009 |
| refractive index difference between under-cladding and over-cladding | 0.000 | 0.000 | 0.000 | 0.000 | 0.000 | 0.000 | 0.000 | 0.000 |
| wavelength (μm) | 1.31 | 1.31 | 1.31 | 1.31 | 1.31 | 1.31 | 1.31 | 1.31 |
| connection loss TE (dB) | 0.44 | 0.25 | 0.28 | 0.31 | 0.31 | 0.45 | 0.28 | 0.33 |
| connection loss TM (dB) | 0.44 | 0.25 | 0.28 | 0.31 | 0.32 | 0.46 | 0.28 | 0.33 |

TABLE 9

| | EXAMPLE 3-17 | EXAMPLE 3-18 | EXAMPLE 3-19 | EXAMPLE 3-20 | EXAMPLE 3-21 | EXAMPLE 3-22 | EXAMPLE 3-23 | EXAMPLE 3-24 |
|---|---|---|---|---|---|---|---|---|
| core width Wa (μm) | 2.6 | 2.0 | 2.4 | 2.0 | 2.4 | 2.0 | 2.4 | 1.8 |
| core height Ha (μm) | 2.0 | 2.2 | 2.2 | 2.2 | 2.2 | 2.2 | 2.2 | 1.2 |
| Ha/Wa | 0.77 | 1.10 | 0.92 | 1.10 | 0.92 | 1.10 | 0.92 | 0.67 |
| refractive index (core) | 1.53 | 1.53 | 1.53 | 1.53 | 1.53 | 1.53 | 1.53 | 1.53 |
| refractive index (under-cladding) | 1.516 | 1.518 | 1.518 | 1.516 | 1.516 | 1.515 | 1.515 | 1.516 |
| refractive index (over-cladding) | 1.516 | 1.518 | 1.518 | 1.516 | 1.516 | 1.515 | 1.515 | 1.516 |
| relative refractive index difference between core and cladding | 0.009 | 0.008 | 0.008 | 0.009 | 0.009 | 0.010 | 0.010 | 0.009 |

TABLE 9-continued

|  | EXAMPLE 3-17 | EXAMPLE 3-18 | EXAMPLE 3-19 | EXAMPLE 3-20 | EXAMPLE 3-21 | EXAMPLE 3-22 | EXAMPLE 3-23 | EXAMPLE 3-24 |
|---|---|---|---|---|---|---|---|---|
| refractive index difference between under-cladding and over-cladding | 0.000 | 0.000 | 0.000 | 0.000 | 0.000 | 0.000 | 0.000 | 0.000 |
| wavelength (μm) | 1.31 | 1.31 | 1.31 | 1.31 | 1.31 | 1.31 | 1.31 | 1.31 |
| connection loss TE (dB) | 0.46 | 0.25 | 0.31 | 0.33 | 0.49 | 0.49 | 0.72 | 2.44 |
| connection loss TM (dB) | 0.46 | 0.25 | 0.32 | 0.33 | 0.49 | 0.49 | 0.73 | — |

TABLE 10

|  | EXAMPLE 3-25 | EXAMPLE 3-26 | EXAMPLE 3-27 | EXAMPLE 3-28 | EXAMPLE 3-29 | EXAMPLE 3-30 | EXAMPLE 3-31 | EXAMPLE 3-32 | EXAMPLE 3-33 | EXAMPLE 3-34 |
|---|---|---|---|---|---|---|---|---|---|---|
| core width Wa (μm) | 2.0 | 2.2 | 2.2 | 2.2 | 2.3 | 2.3 | 2.3 | 2.3 | 2.3 | 2.3 |
| core height Ha (μm) | 1.2 | 2.0 | 2.1 | 2.2 | 2.0 | 2.0 | 2.0 | 2.2 | 2.2 | 2.2 |
| Ha/Wa | 0.60 | 0.91 | 0.95 | 1.00 | 0.87 | 0.87 | 0.87 | 0.96 | 0.96 | 0.96 |
| refractive index (core) | 1.53 | 1.53 | 1.53 | 1.53 | 1.53 | 1.53 | 1.53 | 1.53 | 1.53 | 1.53 |
| refractive index (under-cladding) | 1.516 | 1.517 | 1.517 | 1.517 | 1.518 | 1.518 | 1.518 | 1.515 | 1.515 | 1.515 |
| refractive index (over-cladding) | 1.516 | 1.516 | 1.516 | 1.516 | 1.517 | 1.517 | 1.517 | 1.514 | 1.514 | 1.514 |
| relative refractive index difference between core and cladding | 0.009 | 0.009 | 0.009 | 0.009 | 0.008 | 0.008 | 0.008 | 0.010 | 0.010 | 0.010 |
| refractive index difference between under-cladding and over-cladding | 0.000 | 0.001 | 0.001 | 0.001 | 0.001 | 0.001 | 0.001 | 0.001 | 0.001 | 0.001 |
| wavelength (μm) | 1.31 | 1.31 | 1.31 | 1.31 | 1.27 | 1.31 | 1.35 | 1.27 | 1.31 | 1.35 |
| connection loss TE (dB) | 1.56 | 0.39 | 0.41 | 0.44 | — | — | — | — | — | — |
| connection loss TM (dB) | — | 0.39 | 0.41 | 0.44 | 0.41 | 0.44 | 0.56 | 0.78 | 0.67 | 0.58 |

TABLE 11

|  | EXAMPLE 3-35 | EXAMPLE 3-36 | EXAMPLE 3-37 | EXAMPLE 3-38 | EXAMPLE 3-39 |
|---|---|---|---|---|---|
| core width Wa (μm) | 1.5 | 4.0 | 1.5 | 1.3 | 4.0 |
| core height Ha (μm) | 1.5 | 2.0 | 1.5 | 1.3 | 4.0 |
| Ha/Wa | 1.00 | 0.50 | 1.00 | 1.00 | 1.00 |
| refractive index (core) | 1.53 | 1.53 | 1.53 | 1.53 | 1.53 |
| refractive index (under-cladding) | 1.510 | 1.521 | 1.504 | 1.510 | 1.519 |
| refractive index (over-cladding) | 1.510 | 1.521 | 1.504 | 1.510 | 1.519 |
| relative refractive index difference between core and cladding | 0.013 | 0.006 | 0.017 | 0.013 | 0.007 |
| refractive index difference between under-cladding and over-cladding | 0.000 | 0.000 | 0.000 | 0.000 | 0.000 |
| wavelength (μm) | 1.31 | 1.31 | 1.31 | 1.31 | 1.31 |
| connection loss TE (dB) | 0.30 | 0.20 | 0.75 | 0.91 | 0.63 |
| connection loss TM (dB) | — | — | — | — | — |

In each of Example 3-1 to Example 3-23 and Example 3-26 to Example 3-39 in which the core height Ha was 1.3 μm or more, in all cases, a connection loss with the single-mode optical fiber was small. On the other hand, in Example 3-24 and Example 3-25 in which the core height Ha was less than 1.3 μm, a connection loss with the single-mode optical fiber was large. In Example 3-26 to Example 3-34, although the under-cladding had a different refractive index from that of the over-cladding, no increase in the connection loss with the single-mode optical fiber was observed because a difference between the refractive indexes of the under-cladding and the over-cladding was 0.001 or less.

Although the present invention has been described in detail and by reference to the specific embodiments, it is apparent to one skilled in the art that various modifications or changes can be made without departing from the spirit and scope of the present invention.

This application is a continuation of prior International Application No. PCT/JP2019/019005, filed on May 13, 2019 which is based upon and claims the benefit of priority from Japanese Patent Application No. 2018-096373, filed on May 18, 2018, the disclosure of which is incorporated herein by reference.

REFERENCE SIGNS LIST

10: Polymer Optical Waveguide
11a, 11b: Core
12: Under-cladding
13: Over-cladding
14: Coupling Section
15: Optical Waveguide Section
20: Composite Optical Waveguide
30: Silicon Optical Waveguide
40: Polymer Optical Waveguide
41: Core
42: Under-cladding
43: Over-cladding
44: Coupling Section
45: Optical Waveguide Section
46: Pitch Changing region
50: Connector
60: Polymer Optical Waveguide
61a, 61b, 61c: Core
62: Under-cladding
63: Over-cladding
64: Coupling Section
65: Optical Waveguide Section
66: Pitch Changing region
70a, 70b, 70c, 70d, 70e: Polymer Optical Waveguide
71a, 71b, 71c, 71d, 71e: Core
72a, 72b, 72c, 72d, 72e: Under-cladding
73a, 73b, 73c, 73d, 73e: Over-cladding
74a, 74b, 74c, 74d, 74e: Coupling Section
75a, 75b, 75c, 75d, 75e: Optical Waveguide Section
76a, 76b, 76c, 76d, 76e: Pitch Changing region
80: Polymer Optical Waveguide
81: Core
82: Under-cladding
83: Over-cladding
84: Connection Portion
85: Optical Waveguide Section
86: Adiabatic Coupling Section
90: Silicon Optical Waveguide
91: Core
92: Cladding
93: Adiabatic Coupling Section
94: Region in which only cladding is provided
100: Adhesive
101: Region between silicon optical waveguide and optical waveguide section of polymer optical waveguide
110: Barrier Layer
120: Polymer Optical Waveguide
121: Core
122: Under-cladding
123: Over-cladding
126: Pseudo Pitch Changing region (Curved Core Portion)
130: Polymer Optical Waveguide
131: Core
132: Under-cladding
133: Over-cladding
135: Optical Waveguide Section

What is claimed is:

1. A polymer optical waveguide, comprising:
a core;
an under-cladding that has a refractive index lower than a refractive index of the core and is provided around the core; and
an over-cladding that has a refractive index lower than the refractive index of the core and is provided around the core on a side opposite to the under-cladding,
wherein the polymer optical waveguide comprises a coupling section and an optical waveguide section that are provided along a light propagation direction, the coupling section is a section in which the over-cladding is not provided and the core and the under-cladding around the core are exposed, and the optical waveguide section is a section in which the core is covered with the under-cladding and the over-cladding,
wherein the polymer optical waveguide comprises portions having different core widths along the light propagation direction,
wherein, a core width at a portion a having a narrowest core width is located in the optical waveguide section and when the narrowest core width is denoted Wa (μm) and a core height at the portion a is denoted Ha (μm), Ha is 1.3 μm or more and 4.5 μm or less, and Ha/Wa is 1.15 or less.

2. The polymer optical waveguide according to claim 1, wherein Wa is 1.3 μm or more and 4.5 μm or less.

3. The polymer optical waveguide according to claim 1, comprising a plurality of the cores disposed along the light propagation direction, and
having a pitch between the plurality of cores differing on one end side and the other end side of the polymer optical waveguide,
wherein the polymer optical waveguide comprises a pitch changing region that changes the pitch between the plurality of cores, and,
when the core width in the pitch changing region is denoted Wp (μm), Wp is 2.2 μm or more and 6 μm or less.

4. The polymer optical waveguide according to claim 1, wherein an absolute value of a refractive index difference between the under-cladding and the over-cladding is 0.001 or less.

5. The polymer optical waveguide according to claim 1, wherein a relative refractive index difference u between the core and the under-cladding is from 0.006 to 0.017, and
wherein a relative refractive index difference o between the core and the over-cladding is from 0.006 to 0.017.

6. The polymer optical waveguide according to claim 1, wherein, when the core width in the coupling section is denoted Ws (μm), Ws is 3 μm or more and 8 μm or less.

7. The polymer optical waveguide according to claim 1, comprising a plurality of the cores disposed along the light propagation direction,
wherein at least one of the plurality of cores is not included in the coupling section and is included in only the optical waveguide section.

8. The polymer optical waveguide according to claim 1, wherein the core comprises a polymer containing fluorine.

9. A composite optical waveguide, comprising:
the polymer optical waveguide as described in claim 1, and
a connector that accommodates the optical waveguide section of the polymer optical waveguide.

* * * * *